(12) United States Patent
Hautson et al.

(10) Patent No.: US 10,331,220 B2
(45) Date of Patent: Jun. 25, 2019

(54) CONFIGURE HUMAN-MACHINE INTERFACE INCLUDING A UTENSIL AND AN ARRAY OF MAGNETOMETERS

(71) Applicant: COMMISSARIAT A L 'ENERGIE ATOMIQUE ET AUX ENERGIES ALTERNATIVES, Paris (FR)

(72) Inventors: Tristan Hautson, Fontaine (FR); Rabeb Aloui, Fontaine (FR); Timothee Jobert, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 34 days.

(21) Appl. No.: 14/784,633

(22) PCT Filed: May 5, 2014

(86) PCT No.: PCT/EP2014/059139
§ 371 (c)(1),
(2) Date: Oct. 15, 2015

(87) PCT Pub. No.: WO2014/180796
PCT Pub. Date: Nov. 13, 2014

(65) Prior Publication Data
US 2016/0091981 A1 Mar. 31, 2016

(30) Foreign Application Priority Data
May 7, 2013 (FR) ...................................... 13 54160

(51) Int. Cl.
*G09G 5/00* (2006.01)
*G06F 3/01* (2006.01)
(Continued)

(52) U.S. Cl.
CPC .......... *G06F 3/017* (2013.01); *G06F 3/03545* (2013.01); *G06F 3/046* (2013.01)

(58) Field of Classification Search
None
See application file for complete search history.

(56) References Cited

U.S. PATENT DOCUMENTS

| 6,263,230 B1 * | 7/2001 | Haynor | ................. | A61B 5/062 128/899 |
| 6,269,324 B1 * | 7/2001 | Rakijas | ................. | G01V 3/081 324/207.11 |

(Continued)

FOREIGN PATENT DOCUMENTS

| WO | 99 66997 | 12/1999 |
| WO | WO 2010/149781 A2 | 12/2010 |

OTHER PUBLICATIONS www.dictionary.com/browse/coordinates?s=t, p. 1.*
(Continued)

*Primary Examiner* — Lunyi Lao
*Assistant Examiner* — Kirk W Hermann
(74) *Attorney, Agent, or Firm* — Oblon, McClelland, Maier & Neustadt, L.L.P.

(57) ABSTRACT

A configurable human-machine interface for controlling an electrical apparatus includes at least one permanent magnet rigidly connected to each of utensils and a magnetometer array including N triaxial magnetometers, mechanically linked to each other without any degree of freedom to retain a known distance between each of the magnetometers, wherein N is a whole number greater than or equal to five, and a processing unit configured to: define, for each permanent magnet of a utensil, a value of at least one variable encoding a position or orientation of same in a three-dimensional reference system fixed without any degree of freedom to the array or the amplitude of the magnetic (Continued)

moment of same, from measurements of the magnetometers of the array, and automatically select a control law based on the value defined for the variable.

13 Claims, 2 Drawing Sheets

(51) Int. Cl.
  *G06F 3/046* (2006.01)
  *G06F 3/0354* (2013.01)

(56) References Cited

U.S. PATENT DOCUMENTS

| | | | | |
|---|---|---|---|---|
| 7,932,718 | B1 * | 4/2011 | Wiegert | G01V 3/081 |
| | | | | 324/245 |
| 9,256,588 | B1 * | 2/2016 | Moscovich | G06F 17/241 |
| 9,285,903 | B1 * | 3/2016 | Yun | G06F 3/041 |
| 9,785,272 | B1 * | 10/2017 | Rosenberg | G06F 3/0414 |
| 2003/0095115 | A1 | 5/2003 | Brian et al. | |
| 2005/0083316 | A1 | 4/2005 | Brian et al. | |
| 2005/0270494 | A1 * | 12/2005 | Banning | G03B 21/00 |
| | | | | 353/42 |
| 2006/0109253 | A1 | 5/2006 | An et al. | |
| 2013/0009907 | A1 * | 1/2013 | Rosenberg | G06F 3/046 |
| | | | | 345/174 |
| 2013/0249784 | A1 * | 9/2013 | Gustafson | G01R 33/072 |
| | | | | 345/156 |
| 2014/0168174 | A1 * | 6/2014 | Idzik | G06F 3/046 |
| | | | | 345/179 |
| 2014/0253521 | A1 * | 9/2014 | Hicks | G06F 3/03545 |
| | | | | 345/179 |
| 2015/0253908 | A1 * | 9/2015 | Go | G06F 3/046 |
| | | | | 345/173 |

OTHER PUBLICATIONS

Dictionary.com definition of coordinates, 2018, http://www.dictionary.com/browse/coordinates?s=t, p. 1 (Year: 2018).*
International Search Report dated Jul. 15, 2014 in PCT/EP14/059139 Filed May 5, 2014.

* cited by examiner

CONFIGURE HUMAN-MACHINE INTERFACE INCLUDING A UTENSIL AND AN ARRAY OF MAGNETOMETERS

The invention relates to a configurable human-machine interface for controlling an electrical apparatus. The invention also relates to a method for controlling an electrical apparatus with such a configurable human-machine interface and also to an information recording medium for carrying out this method.

Human-machine interfaces are used in a very large number of different technical fields for controlling an electrical apparatus. For example, the electrical apparatus may be a robot, a computer screen, a games console or any type of electrical or electronic apparatus that must be controlled by a human being.

So as to be able to adapt to different electrical apparatuses, or to different situations, it is desirable for the human-machine interface to be configurable. Configurable human-machine interfaces comprise:
- at least one movable utensil, each utensil being actuatable directly by the hand of a user so as to pass between at least one first state of control of the electrical apparatus and a second state,
- a processing unit able:
  - to automatically select a control law to be associated with the utensil actuated by the user from a number of different control laws of the electrical apparatus, each control law associating a first control of the electrical apparatus with the first state of a utensil and a second, different control or no control of the electrical apparatus with the second state of this same utensil, and
  - to generate and to transmit a control to the electrical apparatus depending on the current state of the utensil and depending on the control law that has been selected for this utensil.

The control law associated with a utensil determines the functioning of this utensil in a given configuration of the interface. Consequently, in these human-machine interfaces, since the control law associated with a utensil is automatically selected, it is easy for the user to modify the configuration of this machine interface:
- by replacing one utensil with another, or
- by adding an additional utensil, or
- by removing a utensil, or
- by moving a utensil, for example so as to adapt to a left-handed or right-handed user.

However, the realization of such a configurable human-machine interface is complex. For example, it has been proposed to equip each utensil with an emitter, which sends to the processing unit an identifier of the control law to be used with this utensil. However, it is necessary to supply power to this emitter, which complicates the realization of the configurable human-machine interface.

The following prior art documents are also known: US2013/009907A1, US2003/095115A1 and WO99/66997A1.

The invention aims to overcome this disadvantage by proposing a configurable human-machine interface that can be realized more easily. The invention therefore relates to such a human-machine interface according to claim 1.

In the above human-machine interface, the processing unit is able to select the control law to be associated with a utensil on the basis of the features of a permanent magnet with which the utensil is equipped. Thus, in this interface, it is not necessary to supply power to an emitter or another similar device, which simplifies the realization of the human-machine interface.

The embodiments of this human-machine interface may comprise one or more of the features of the dependent claims.

These embodiments of the human-machine interface also have the following advantages:
- use of the same magnetometer array to provide the measurements that make it possible both to select the control law and to establish the current state of the utensil, further simplifying the realization of the configurable human-machine interface;
- equipping of the utensil with a permanent magnet of which the direction of the magnetic moment is parallel to the axis of the utensil, making it possible to use this utensil as a joystick or cross-shaped button.

The invention also relates to a method for controlling an electrical apparatus according to claim 5.

The embodiments of this control method may comprise one or more of the features of the dependent method claims.

These embodiments of the control method also have the following advantages:
- use of some of the variables to select the control law and of other variables to establish the current state of the utensil, thus simplifying the realization of the interface because the same permanent magnet is then used both to select the control law and to establish the state of the utensil;
- use of solely the variables encoding the orientation of the permanent magnet of the utensil, thus making it possible to dispose this same utensil in a very large number of different locations with respect to the magnetometer array without modifying the operation of said utensil;
- use of the variable values encoding the position of a permanent magnet of the utensil in order to select the control law to be associated with this utensil, thus making it possible to modify the operation of this utensil by displacing said utensil with respect to the magnetometer array;
- use of the relative position of a permanent magnet of the utensil with respect to another permanent magnet independent of this utensil, thus making it possible to modify the functioning of this utensil by modifying simply the relative position thereof with respect to this other separate permanent magnet;
- use of the amplitude of the magnetic moment of a permanent magnet with which the utensil is equipped in order to select the control law, thus making it possible to reconfigure, in a simple manner, the human-machine interface by replacing this utensil with another utensil equipped with a permanent magnet of which the amplitude of the magnetic moment is different;
- selection of the control law to be associated with a utensil on the basis of the relative position of different permanent magnets with which this utensil is equipped, thus making it possible to modify the configuration of the human-machine interface by replacing this utensil with another utensil equipped with permanent magnets of which the relative position with respect to one another is different.

The invention also relates to an information recording medium comprising instructions for executing the above method when these instructions are executed by an electronic computer.

The invention will be better understood upon reading the following description, which is given solely by way of non-limiting example and with reference to the drawings, in which.

In these figures, the same references are used to designate the same elements.

In the description below, the features and functions well known to the person skilled in the art are not described in detail.

Figure 1:
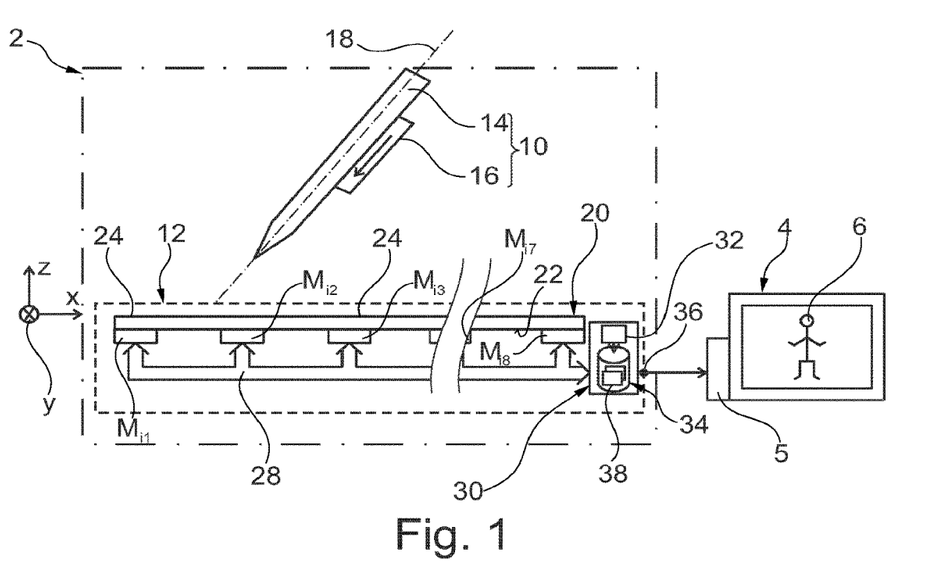
FIG. 1 is a schematic illustration of a human-machine interface making it possible to control an electrical apparatus.

FIG. 1 shows a human-machine interface 2 making it possible to control an electrical apparatus 4. Here, the electrical apparatus comprises a screen and a control unit 5 able to control the display of an image on this screen.

Here, the functioning of the interface 2 is illustrated in the case in which the unit 5 is a video games console. For example, the unit 5 controls the movement of a person 6 on the screen. However, the interface 2 can be used in numerous other applications, as is described at the end of this description.

The interface 2 comprises a number of utensils that can be actuated directly by hand by a human being, referred to hereinafter as the "user". Each of these utensils comprises at least one permanent magnet. In order to simplify FIG. 1, only one utensil 10 is shown in this figure. Other utensils of the interface 2 are described with reference to FIGS. 3 to 7. The interface 2 also comprises a device 12 for locating each utensil.

In this embodiment, in order to modify the configuration of the interface 2, each utensil is freely movable, directly by the hand of the user, in an orthogonal coordinate system XYZ fixed without any degree of freedom to the device 12. Here, the directions X and Y are horizontal and the direction Z is vertical. To this end, each utensil weighs less than a kilo and preferably less than 200 g. The dimensions of each utensil are sufficiently reduced so that said utensil can be gripped and moved by a single hand of the user.

In this embodiment the utensil 10 includes a lever 14 and a permanent magnet 16 having a magnetic moment not equal to zero, even in the absence of an external magnetic field. The lever 14 has an oblong shape so as to form a handle that can be easily gripped by the user. The lever extends along a longitudinal axis 18. The lever 14 may be freely inclined by the user about any one of the axes X, Y and Z of the coordinate system XYZ. Here, the lever 14 is intended to be used as a joystick. For example, the lever 14 is made entirely of a non-magnetic material, i.e. a material devoid of any magnetic property measurable by the device 12. This material is plastic, for example.

The utensil 10 is located on the basis of the position of the magnet 16. Here, no limit is applied to the degrees of freedom of the utensil 10. In particular, the utensil is not mechanically connected to the device 12 and may be used without mechanical contact with the device 12.

Typically, the coercive magnetic field of the magnet 16 is greater than 100 A·m$^{-1}$ or 500 A·m$^{-1}$. For example, it is made of a ferromagnetic or ferrimagnetic material.

The magnet 16 is fixed without any degree of freedom on the lever 14. The direction of the magnetic moment of the magnet 16 is parallel to the longitudinal axis 18 of the lever 14. In FIG. 1 and the following figures the direction of the magnetic moment of a magnet is shown by an arrow. The greatest length of this magnet is designated L hereinafter. The power of the permanent magnet is typically greater than 0.01 A·m$^2$ or 0.1 A·m$^2$.

The device 12 makes it possible to locate the magnet 16 in the coordinate system XYZ. Here, 'locating' means the determination of the position and of the orientation of the magnet 16 in the coordinate system XYZ. The position is defined without ambiguity by the values of three variables, for example the coordinates x, y and z of the magnet 16 in the coordinate system XYZ. More precisely, the variables x, y and z are the coordinates of the geometric center of the magnet 16. The geometry center of an object is the barycenter of all the points of this object, with assignment of the same weight to each of these points. The orientation of the magnetic moment of the magnet 16 is defined without ambiguity by the values of two variables $\theta_y$ and $\theta_z$. Here, the variables $\theta_y$ and $\theta_z$ are the angles of the magnetic moment of the magnet 16 with respect to the axes Y and Z respectively of the coordinate system. The device 12 also determines a sixth variable A. The variable A is the amplitude of the magnetic moment of the magnet 16.

The device 12 for this purpose comprises an array of N triaxial magnetometers $M_{ij}$. In FIG. 1 the vertical wavy lines indicate a part of the device 12 that has not been shown.

Typically, N is greater than five and preferably greater than sixteen or thirty-two. Here, N is greater than or equal to sixty-four.

In this embodiment the magnetometers $M_{ij}$ are aligned in rows and in columns in order to form a matrix. Here, this matrix comprises eight rows and eight columns. The indices i and j identify, respectively, the row and the column of this matrix at the intersection of which the magnetometer $M_{ij}$ is located. In FIG. 1 only the magnetometers $M_{i1}$, $M_{i2}$, $M_{i3}$, $M_{i4}$ and $M_{ij}$ of a row i are visible. The position of the magnetometers $M_{ij}$ with respect to one another is described in greater detail with reference to FIG. 2.

Each magnetometer $M_{ij}$ is fixed without any degree of freedom to the other magnetometers. To this end, the magnetometers $M_{ij}$ are fixed without any degree of freedom on a rear face 22 of a rigid plate 20. This rigid plate has a front face 24 turned towards the magnet 16. The plate 20 is made of a rigid non-magnetic material. The plate 20 is made of glass, for example.

Each magnetometer $M_{ij}$ measures the direction and the intensity of the magnetic field generated by the magnet 16. For this, each magnetometer $M_{ij}$ measures the magnitude of the orthogonal projection of the magnetic field generated by the magnet 16 at this magnetometer $M_{ij}$ over three axes of measurement of this magnetometer. Here, these three axes of measurement are orthogonal to one another. For example, the axes of measurement of each of the magnetometers $M_{ij}$ are parallel respectively to the axes X, Y and Z of the coordinate system. The sensitivity of the magnetometer $M_{ij}$ is, for example, $4*10^{-7}$T.

Each magnetometer $M_{ij}$ is connected by way of an information-transmitting bus 28 to a processing unit 30.

The processing unit 30 is able to determine the location of the magnet 16 in the coordinate system XYZ and the amplitude of the magnetic moment thereof on the basis of the measurements of the magnetometers $M_{ij}$. To this end, the unit 30 comprises a programmable electronic computer 32 able to execute instructions recorded on an information recording medium. The unit 30 thus also comprises a memory 34 containing the instructions necessary for the execution by the computer 32 of the method of FIG. 9. In particular, for each number P of magnetic objects able to be used simultaneously in the interface 2, the unit 30 implements a mathematical model $M_P$ associating each measurement of a magnetometer $M_{ij}$ with the positions, orientations and amplitudes of the magnetic moments of P magnetic objects in the coordinate system XYZ. Each model $M_P$ is present in the form of a system of equations in which a first set of variables represents the positions and orientations of the P magnetic objects as well as the amplitudes of the magnetic moments of these objects. A second set of variables represents the measurements of the magnetometers $M_{ij}$. To obtain the positions, orientations and amplitudes of the magnetic moments of the P magnetic objects, the variables of the first set are unknown and the values of the variables of the second set are known. This model is typically constructed on the basis of the physics equations of electromagnetism. This model is parameterized by the known distances between the magnetometers $M_{ij}$. Here, the magnetic objects are the permanent magnets. To construct this model, each permanent magnet is approximated by a magnetic dipole. This approximation introduces only very few errors if the distance between the permanent magnet and the magnetometer $M_{ij}$ is greater than 2L and preferably greater than 3L, where L is the greatest dimension of the permanent magnet. L is typically less than 20 cm, and preferably less than 10 or 5 cm.

Here, the model $M_P$ is not linear. The unit 30 resolves this by implementing an algorithm for estimating its solution. For example, the algorithm used is an ensemble Kalman filter known more commonly by the name "unscented Kalman filter".

Given that each magnetic dipole is characterized by three variables in order to know its position, two variables in order to know its orientation, and one variable in order to know the amplitude of its magnetic moment, the maximum number of magnetic dipoles that can be located simultaneously by the array of N magnetometers is less than N/2. Consequently, the value of the number P is less than or equal to N/2 and preferably less than N/5 or N/10 or N/20 so as to have redundant measurements. The redundancy of the measurements makes it possible to improve the accuracy of the locating of the dipoles.

In this embodiment only five mathematical models $M_1$, $M_2$, $M_3$, $M_4$ and $M_5$ are implemented in the unit 30 for, respectively, 1, 2, 3, 4 and 5 permanent magnets present simultaneously.

The unit 30 is also able to transmit a control to the apparatus 4 by way of an interface 36 connected to this apparatus 4.

The memory 34 also comprises a database 38 in which a plurality of control laws of the apparatus 4 are recorded. Each control law makes it possible to generate the control of the apparatus 4 corresponding to the current state of the utensil with which said control law is associated. To this end, each control law associates:

a control of the apparatus 4 with at least one possible state of the utensil, and another control of the apparatus 4 or an absence of control of the apparatus 4 with another possible state of the same utensil.

The control law thus determines how the apparatus 4 functions in response to the actuation, by the user, of the utensil associated with this control law. This database 38 is described in greater detail with reference to FIG. 8.

Figure 2:
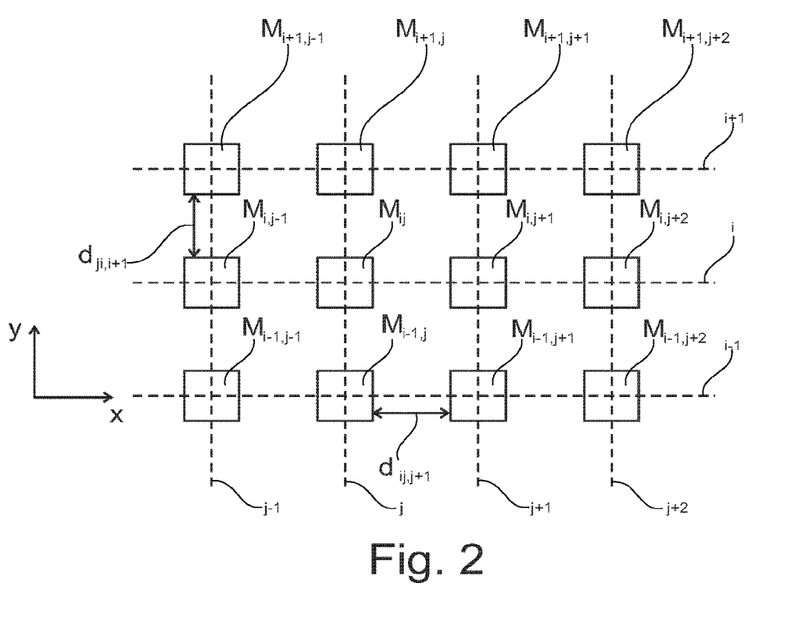
FIG. 2 is a partial illustration from above of a magnetometer array implemented in the human-machine interface of FIG. 1.

FIG. 2 shows some of the magnetometers $M_{ij}$ of the device 12. These magnetometers $M_{ij}$ are aligned in rows i parallel to the direction X. These magnetometers are also aligned in columns j parallel to the direction Y so as to form a matrix. The rows i and columns j are disposed in the order of increasing indices.

The center of the magnetometer $M_{ij}$ is located at the intersection of the row i and of the column j. The center of the magnetometer corresponds to the point where the magnetic field is measured by this magnetometer. Here, the indices i and j belong the range [1; 8].

The centers of two magnetometers $M_{ij}$ and $M_{ij+1}$ immediately in succession along a row i are separated by a known distance $d_{i,j,j+1}$. Similarly, the center of two magnetometers $M_{ij}$ and $M_{i+1,j}$ immediately in succession along the same column j are separated by a known distance $d_{j,i,i+1}$.

In the particular case described here, whatever the row i, the distance $d_{i,j,j+1}$ is the same. This distance is therefore denoted $d_j$. Similarly, whatever the column j, the distance $d_{j,i,i+1}$ between two magnetometers is the same. This distance is thus denoted $d_i$.

Here, the distances $d_i$ and $d_j$ are both equal to d.

Typically, the distance d is less than, preferably two times less than, the shortest distance that may exist between two magnetic objects simultaneously present in front of the face 24 in the event of normal use of the interface 2. Here, the distance d is between 1 and 4 cm when:

the power of the permanent magnet is 0.5 A·m², the sensitivity of the magnetometers is $4*10^{-7}$T, and the number of magnetometers $M_{ij}$ is sixty-four.

FIGS. 3 to 7 show other utensils that can be used instead of the utensil 10 or simultaneously with the utensil 10 in the interface 2.

Figure 3:
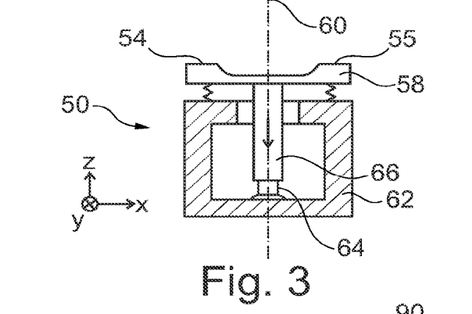
FIG. 3 is a schematic illustration, in vertical section, of a cross-shaped button that can be used in the interface of FIG. 1.
Figure 4:
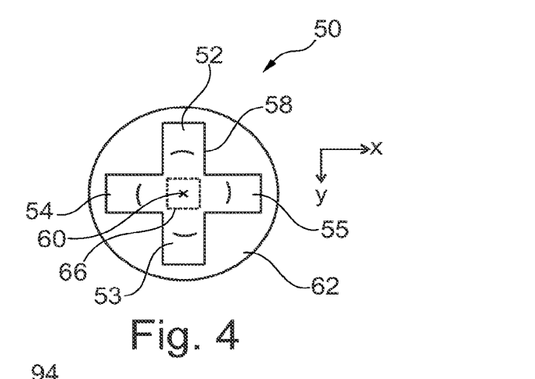
FIG. 4 is a schematic illustration from above of the cross-shaped button of FIG. 3.

FIGS. 3 and 4 show a cross-shaped button 50. Typically, such a button is intended to indicate a direction of movement selected from four perpendicular directions of movement. The button 50 for this purpose comprises four keys 52 to 57 disposed at the ends of the arms of a cross 58 in the form of a "+" symbol. The cross 58 extends substantially in a plane perpendicular to an axis 60 passing through the geometric center of this cross. The axis 60 is fixed, with no degree of freedom, to the cross 58. Here, the cross 58 forms merely a single block of matter made of a non-magnetic material. The cross 58 is connected to the base of a housing 62 via a connection 64 making it possible to incline the axis 60 with respect to the vertical in any direction when the base of the housing 60 is disposed horizontally. This connection 64 is a ball joint, for example.

The button 50 is also equipped with biasing means, able to permanently urge the cross 58 into its horizontal position. For example, these biasing means comprise identical springs arranged between each key 52 to 55 and a front face of the housing 62.

The button 50 is actuated by the user in order to pass:
from a rest state in which the cross 58 is in its horizontal position,
into one pressed state from four possible pressed states.
Here, each pressed state corresponds to a state in which a single respective key 52 to 55 is pressed.

In order to determine the current state of the button 50, a permanent magnet 66 is fixed without any degree of freedom to the cross 58. For example, the magnet 66 is fixed to the cross 58 in such a manner that the direction of the magnetic moment of said magnet matches that of the axis 60. In these conditions the current state of the button 50 may be established by using solely the inclination of the magnet 66, i.e. the values of the variables $\theta_Y$ and $\theta_Z$ determined for this magnet 66. Here, the values of the variables x, y, z and A of the magnet 66 are not used to establish the current state of the button 50. By contrast, as explained hereinafter, the values of these four variables may be used to select the control law associated with the button 50.

Here, the amplitude of the magnetic moment of the magnet 66 is unique, that is to say different from the amplitude of all the other permanent magnets that may be used in the interface 2.

Figure 5:
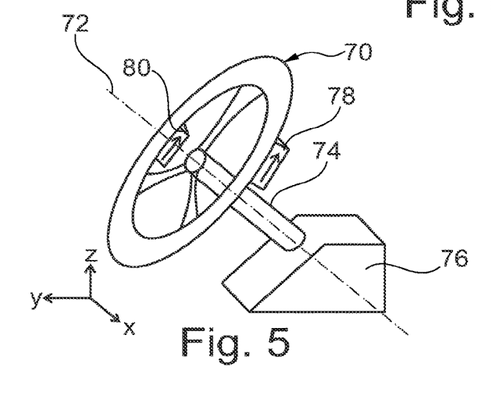
FIG. 5 is a schematic perspective illustration of a steering wheel that can be used in the interface of FIG. 1.

FIG. 5 shows a steering wheel 70 mounted in rotation about an axis 72. A steering wheel of this type is intended to be used for example to indicate an angle of rotation α. Here, the steering wheel 70 is fixed at the end of a shaft 74 extending along the axis 72. The other, opposite end of the shaft 74 is mounted freely in rotation in a stand 76 intended to rest on the front face 24 of the device 12. The shaft 74 and the stand 76 hold the steering wheel 70 in the air so as to facilitate the use thereof.

The steering wheel 70 may be turned manually by a user in order to assume an infinity of different states. In the case of the steering wheel 70, each state corresponds to a unique value of the angle α. Here, the state in which the angle α is zero is referred to as the rest state.

In order to measure the angle α of the steering wheel 70 about the axis 72, the steering wheel is equipped in this embodiment with two permanent magnets 78 and 80. These magnets are fixed without any degree of freedom on the steering wheel 70, for example in diametrically opposed positions with respect to the axis 72. Here, these magnets 78 and 80 are identical. The direction of the magnetic moment of each of these magnets is tangent to a circle parallel to the plane in which the steering wheel 70 extends fundamentally and of which the center is located on the axis 72. Here, in the rest state, the magnets 78 and 80 are symmetrical to one another with respect to a vertical plane. Consequently, any deviation from this rest state corresponds to an angle α different from zero.

Here, the angle α is determined solely on the basis of the orientation of the magnets 70 and 80. The position of these magnets 78 and 80 and the amplitude A of these magnets may therefore be used to select the control law to be associated with this steering wheel 70.

The amplitude of the magnetic moment of these magnets 78 and 80 is unique in the interface 2.

Figure 6:
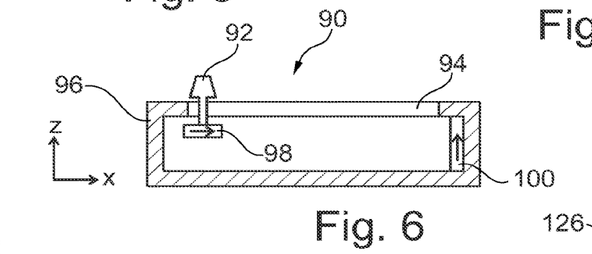
FIG. 6 is a schematic illustration, in vertical section, of a cursor that can be used in the interface of FIG. 1.

FIG. 6 shows a cursor 90. This cursor for example makes it possible to control the value of a parameter of the electrical apparatus 4. This cursor 90 for this purpose comprises a slide 92 mounted displaceably in translation in a rectilinear slot 94 formed in an upper face of a housing 96. The user may slide the slide 92 by hand in order to modify the state of the cursor 90. In the case of the cursor 90, each state corresponds to a particular position of the slide 92 along the slot 94.

In order to measure the position of the slide 92 along the slot 94, the cursor 90 is equipped:
with a permanent magnet 98 fixed without any degree of freedom to the slide 92, and
with a permanent magnet 100 fixed without any degree of freedom to the housing 96.

In these conditions, the state of the cursor 90 may be established by the relative position of the magnet 98 with respect to the magnet 100. Here, the state of the cursor 90 is established on the basis of the value of the shortest distance $d_{90}$ between the geometric centers of the magnets 98 and 100.

Consequently, the absolute position of the magnet 100 and orientation thereof may be used to select the control law to be associated with this cursor 90.

In this embodiment the direction of the magnetic moment of the magnet 100 is parallel to the axis Z when the slot 94 extends horizontally. The amplitudes of the magnetic moments of the magnets 98 and 100 are unique in the interface 2 and are different from one another.

Figure 7:
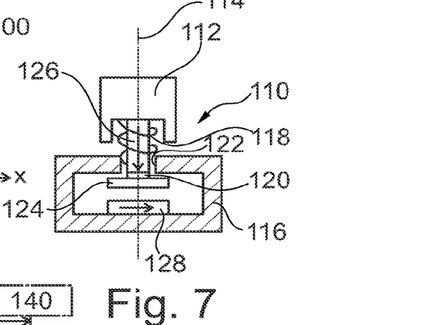
FIG. 7 is a schematic illustration, in vertical section, of a button that can be used in the interface of FIG. 1.

FIG. 7 shows a button 110. This button 110 is movable manually by a user between a rest state (shown in FIG. 7) and a pressed state. Typically, the button 110 is intended to trigger an action of the apparatus 4 solely when it has reached its pressed state.

This button 110 comprises a key 112 movable solely in translation along an axis 114 connected to a housing 116 between a rest position (shown in FIG. 7) and a pressed position. In FIG. 7 the axis 114 is vertical. The rest and pressed states correspond, respectively, to the rest and pressed states of the key 112.

The button 110 comprises biasing means, which permanently urge the key 112 into the rest position thereof. These biasing means here comprise a spring 118 disposed between a lower part of the button 112 and an upper face of the housing 116.

A rectilinear rod 120 extends along the axis 114, this rod 120 being fixed at one end without any degree of freedom to the key 112 and at the other end to a stop 124. This rod 120 is mounted slidingly within an orifice 122 formed in the upper face of the housing 116.

The stop 124 makes it possible to retain the lower end of this rod 120 within the housing 116.

In order to determine the current state of the button 110, the rod 120 comprises a permanent magnet 126 fixed without any degree of freedom on this rod. In this embodiment the direction of the magnetic moment of the magnet 126 matches the axis 114.

Another permanent magnet 128 is also fixed without any degree of freedom on the base of the housing 116.

Consequently, the current state of the button 110 may be established on the basis of the relative position of the magnet 126 with respect to the magnet 128. For example, the state is established on the basis of the value of a distance $d_{110}$ and a threshold $S_0$. The distance $d_{110}$ is the shortest distance separating the geometric centers of the magnets 126 and 128. The threshold $S_0$ is used to discriminate the pressed state from the rest state. If the distance $d_{110}$ is lower than the threshold $S_0$, this means that the button 110 is in its pressed state. Conversely, if the distance $d_{110}$ is greater than this threshold $S_0$, the button 110 is in its rest state.

The distance $d_{110}$ is independent of the values of the variables x, y, A, $\theta_Y$, $\theta_Z$ of the magnets 126 and 128. Consequently, the value of these variables may be used to select the control law to be associated with this button 110 when used in the interface 2.

Here, the magnets 126 and 128 are structurally identical.

Figure 8:
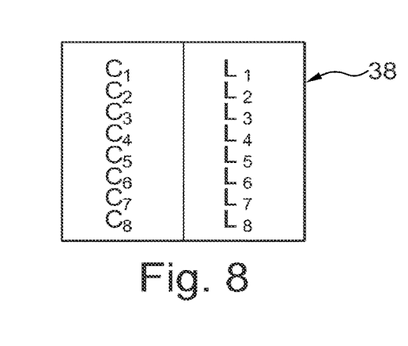
FIG. 8 is a schematic illustration of a database used in the interface of FIG. 1.

FIG. 8 shows in greater detail the database 38. This database 38 comprises a number of pre-recorded control laws $L_i$. In addition, it associates each pre-recorded law $L_i$ with a selection condition $C_i$. If the condition $C_i$ is verified by a permanent magnet or a pair of permanent magnets of a utensil, this control law is then associated with the utensil equipped with this magnet or pair of magnets. The index "i" identifies the control law $L_i$ and also the condition $C_i$ associated with this law $L_i$ by the database 38. Each condition $C_i$ relates to the values of the variables determined for the permanent magnets that equip a utensil and that generally are not used to establish the current state of this utensil.

By way of illustration, a number of examples of control laws and conditions associated with these control laws will now be described.

The law $L_1$ is a control law that uses solely the values of the variables $\theta_Y$ and $\theta_Z$. More precisely, it transforms each value of the angles $\theta_Y$ and $\theta_Z$ into a respective control of the apparatus 4. For example, this control may cause a movement of the person 6 in a direction specified by the values of the angles $\theta_Y$ and $\theta_Z$.

This law $L_1$ is associated with a condition $C_1$. The condition $C_1$ is as follows: the value of the variable A must be between $S_1$ and $S_2$, where $S_1$ and $S_2$ are predefined limits, such that only the amplitude of the magnetic moment of the magnet 16 is between these limits. This law $L_1$ is therefore intended to be associated with the utensil 10. If the device 12 determines that the value of the variable A of a permanent magnet is between $S_1$ and $S_2$, then it uses the law $L_1$ to convert the values of the angles $\theta_Y$ and $\theta_Z$ of this same magnet into a control of the apparatus 4. Consequently, by modifying the inclination of the utensil 10, it is possible to control the apparatus 4. This remains true whatever the position of the utensil 10 with respect to the device 12 from the moment at which the presence of the magnet 16 can be detected. The location of the utensil 10 may therefore be selected freely by the user, which corresponds to a possible configuration infinity for the interface 2.

The law $L_2$ is a control law identical to the law $L_1$, but which generates different controls of the apparatus 4 for the same values of the angles $\theta_Y$ and $\theta_Z$. The law $L_2$ is associated with the condition $C_2$. The condition $C_2$ is as follows:
the value of the amplitude of the magnetic moment is between the limits $S_3$ and $S_4$, and
the coordinates x, y and z of this permanent magnet are situated within a predefined zone $V_D$.

The limits $S_3$ and $S_4$ are predefined limits such that only the amplitude of the magnetic moment of the permanent magnet 66 is between these limits. This law is therefore intended to be associated with the cross-shaped button 50.

For example, the zone $V_D$ is the space located to the right of a median plane, where the right is the side labeled by the direction X of the coordinate system XYZ. The median plane is here a plane parallel to the axes Y and Z and that cuts the matrix of magnetometers $M_{ij}$ at the middle thereof. Consequently, the law $L_2$ is associated with the button 60 solely when this is disposed within the zone $V_D$.

The law $L_3$ is identical to the laws $L_1$ and $L_2$ but generates different controls of the apparatus 4 for the same values of the angles $\theta_Y$ and $\theta_Z$.

The law $L_3$ is associated with a condition $C_3$. The condition $C_3$ is identical to the condition $C_2$ except that the zone $V_D$ is replaced by a zone $V_G$. The zone $V_G$ is the volume located to the left of the median plane defined before.

Thus, the law $L_3$ is associated with the button 60, solely if this button is within the zone $V_G$. This thus illustrates a case in which the operation of the same utensil is not the same depending on the location thereof with respect to the array of magnetometers $M_{ij}$. In addition, by using such selection conditions, it is also possible to use simultaneously a copy of the button 60 in the zone $V_D$ and, simultaneously, another copy of the button 60 located within the volume $V_G$. Although these two buttons are structurally identical, the operation of these two buttons is not the same, because the control laws that the processing unit associates with each of these buttons are not the same. This illustrates a situation in which the configuration of the interface 2 may be modified by displacing a utensil from a predefined zone into another predefined zone.

The law $L_4$ is a control law that uses solely the values of the variables $\theta_Y$ and $\theta_Z$ of two permanent magnets to control the apparatus 4 depending on the value of an angle of rotation $\alpha$.

Typically, this law $L_4$ is designed to be associated with the steering wheel 70. To this end, the law $L_4$ is associated by the base 38 with a condition $C_4$. The condition $C_4$ is the following here: the values of the variables A for two separate permanent magnets simultaneously present in front of the face 24 are each between the limits $S_5$ and $S_6$, where the limits $S_5$ and $S_6$ are predefined limits such that only the amplitude of the magnetic moment of the permanent magnets 78 and 80 is between these limits. With this condition $C_4$, the same control law $L_4$ is associated with the steering wheel 70 whatever the location where said steering wheel is disposed on the face 24. The user may therefore freely choose the location where he disposes the steering wheel 70 in the interface 2.

The law $L_5$ is a control law that uses the value of a distance between two permanent magnets to generate a control for adjusting a parameter of the apparatus 4 depending on this distance. This law $L_5$ specifies that the distance is measured between:
a permanent magnet of which the amplitude of the magnetic moment is between predefined limits $S_{71}$ and $S_{81}$ such that only the magnet 98 can satisfy this condition, and
a permanent magnet of which the amplitude of the magnetic moment is between predefined limits $S_{72}$ and $S_{82}$ such that only the magnet 100 can satisfy this condition.

This control law is typically designed to be associated with the cursor 90 such that the distance corresponds to the distance $d_{90}$. For this purpose, the law $L_5$ is associated with a condition $C_5$. This condition $C_5$ is as follows:
the value of the variable A of a permanent magnet is between the limits $S_{72}$ and $S_{82}$, and
the value of the angle $\theta_Z$ of this same permanent magnet is equal to zero, plus or minus 2%.

With such a condition $C_5$, the law $L_5$ is associated with the cursor 90 only when this is positioned such that the slide 92 moves parallel to the face 24. In addition, a single example of the cursor 90 must be disposed horizontally on the face 24 at a given moment.

The law $L_6$ is a control law identical to the law $L_5$, but which generates different controls of the apparatus 4 for the same values of the distance $d_{90}$. For this purpose, the law $L_6$ is associated with a condition $C_6$. The condition $C_6$ is as follows here:
the value of the variable A of a permanent magnet is between the limits $S_{72}$ and $S_{82}$, and
the value of the angle $\theta_Z$ is equal to 90°, plus or minus 2%.

With this condition $C_6$, the law $L_6$ is associated with the cursor 90 only when this is positioned such that the slide 92 moves vertically. Thus, the conditions $C_5$ and $C_6$ make it possible to obtain a case in which the operation of the same utensil is modified depending on its orientation.

The law $L_7$ is a control law that uses only the shortest distance between two identical permanent magnets to generate a control of the apparatus 4. Here, the law $L_7$ is intended to be associated with the button 110, such that the shortest distance corresponds to the distance $d_{110}$. For example, the control law $L_7$ is as follows:

if the distance $d_{110}$ is greater than the threshold $S_0$, then the unit 30 does not generate any control of the apparatus 4, and if the distance $d_{110}$ is less than or equal to the threshold $S_0$, then the unit 30 generates and transmits a control to the apparatus 4.

The law $L_7$ is associated with a condition $C_7$. Here, this condition $C_7$ is as follows:

the values of the variables A of two separate permanent magnets are both between the limits $S_9$ and $S_{10}$, and the shortest distance between these two magnets is lower than a threshold $D_{max110}$, and the positions of these two permanent magnets do not belong to a zone $V_1$.

The limits $S_9$ and $S_{10}$ are predefined constants, such that only the amplitude of the magnetic moment of the magnets 126 and 128 is between these limits. The value of the threshold $D_{max110}$ is selected to be equal to the greatest possible value of the distance $d_{110}$.

The zone $V_1$ here is a volume of predefined dimension of which the location is defined by the position of at least one other magnet mechanically independent of those forming the pair of permanent magnets of this button 110. For example, the zone $V_1$ is the half-space located to the right of a plane parallel to the axes Y and Z and passing through the geometric center of this other permanent magnet. Thus, the functioning of a copy of the button 110 is dependent on the relative position thereof with respect to this other permanent magnet. Here, for the other permanent magnet, the magnets 126 and 128 of another copy of the button 110 simultaneously present in front of the face 24 are used. Thus, the control law associated with one copy of the button 110 is dependent on the position thereof with respect to another copy of this same button.

The law $L_8$ is identical to the law $L_7$ except that for the same distance $d_{110}$ it generates a different control of the apparatus 4. This law $L_8$ is associated with a condition $C_8$. The condition $C_8$ is as follows:

the values of the variables A of two separate permanent magnets are both between the limits $S_9$ and $S_{10}$, and the shortest distance between these two magnets is less than a threshold $D_{max110}$, and the position of these permanent magnets is within the zone $V_1$.

Consequently, if just one button 110 is present in front of the face 24 of the device 12, this button 110 is automatically associated with the law $L_7$, since the location of the zone $V_1$ cannot be defined. By contrast, if two copies of the button 110 are simultaneously present in front of the face 24, the copy of the button 110 that is located to the right of the other button is automatically associated with the law $L_8$, whereas the law $L_7$ is associated with the other copy located more to the left. Thus, the conditions $C_7$ and $C_8$ illustrate a case in which the functioning of a utensil in the interface 2 is dependent on its relative position with respect to another utensil.

Figure 9:
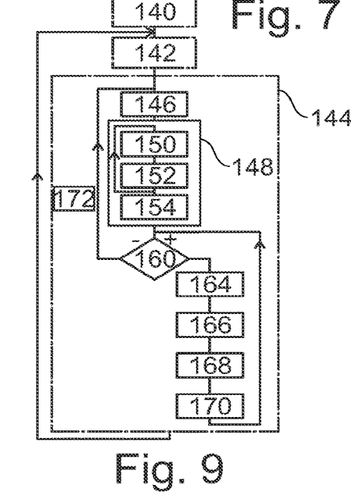
FIG. 9 is an organigram of a method for controlling an electrical apparatus with the aid of the human-machine interface of FIG. 1.

The functioning of the interface 2 will now be described in greater detail with reference to the method of FIG. 9.

This method starts with a phase 140 of initialization, during which the different control laws $L_i$ and the different conditions $C_i$ for selection of these control laws are recorded in the database 38.

Then, a phase 142 of configuration of the interface 2 is performed. During this phase 142, the user chooses one or more utensils from the utensils 10, 60, 70, 90 and 110. Here, it is assumed that there is only one copy of each of the utensils 10 and 70 and two copies of each of the utensils 60, 90 and 110. Then, the user disposes the utensils freely on the face 24 of the device 12. In addition, the user ensures that the configuration realized does not result in there being, simultaneously, more than five permanent magnets in front of the face 24. The human-machine interface is then configured.

It is then possible to proceed with a phase 144 of use of this interface.

The phase 144 starts by a step 146 in which the magnetometers $M_{ij}$ simultaneously measure the magnetic field of the permanent magnet or magnets simultaneously present in front of the face 24.

Then, during a step 148, the unit 30 determines the position, orientation and amplitude of the magnetic moment of each of the permanent magnets present on the basis of the measurements of the magnetometers $M_{ij}$.

For this, during an operation 150, the unit 30 resolves the system of equations of the model $M_1$ at one magnetic dipole. The unit obtains a set of coordinates $x_1$, $y_1$, $z_1$, $\theta_1$ and $\varphi_1$ and an amplitude $A_1$.

Then, during an operation 152, the unit 30 calculates an error $E_1$ representative of the difference between:

the estimation of the values measured by the magnetometers, calculated on the basis of the system of equations $M_1$ and on the basis of the positions, orientations and amplitudes obtained at the end of the operation 150, and the values of the measurements of the magnetometers actually measured during the step 146.

In the case in which the algorithm used to resolve the model is an ensemble or extended Kalman filter, the resolution of this system of equations during the operation 150 generally provides an estimation of this error $E_1$.

Steps 150 and 152 are carried out for P=1 up to P=5. The steps 150 and 152 for each value of P are preferably performed in parallel.

Then, during an operation 154, the unit 130 selects the result obtained with the model $M_P$ giving the smallest error $E_P$. Thus, if there is only a single permanent magnet in front of the face 24, the unit 30 automatically selects the model $M_1$. If, by contrast, there are two permanent magnets, the unit 30 then automatically selects the model $M_2$ and so on.

At the end of this step 148, the number of permanent magnets and the values of the variables x, y, z, $\theta_Y$, $\theta_Z$ and A are known for each of these permanent magnets.

During a step 160, the unit 30 automatically selects the control law to be associated with a permanent magnet or with a pair of permanent magnets by using the values of the six variables determined during the step 148 for each of these magnets. For this, the unit 30 firstly verifies if this permanent magnet or this pair of permanent magnets satisfies one of the conditions $C_i$. If so, the unit 30 automatically selects the control law $L_i$ associated with the condition $C_i$ satisfied in the database 38 and proceeds with a step 164. If not, i.e. if this permanent magnet or this pair of permanent magnets does not satisfy any condition $C_i$, then the unit 30 repeats step 160 for another permanent magnet or another pair of permanent magnets. When there is no longer any permanent magnet or no longer any pair of permanent magnets to test, the method returns to step 146.

For example, during the step 160, if there is a permanent magnet of which the amplitude of the magnetic moment is between the limits $S_1$ and $S_2$, the unit 30 automatically selects the law $L_1$ as being the law to be associated with the utensil equipped with this permanent magnet.

Each time a condition $C_i$ is met, during a step 164, the unit 30 establishes the state of the utensil on the basis of some of the variables x, y, z, $\theta_Y$, $\theta_Z$ and A determined during the step 148 for this permanent magnet or this pair of permanent magnets. For example, in the case of the permanent magnet 16, the unit 30 calculates the inclination of the utensil 10 on the basis of the values of the angles $\theta_Y$ and $\theta_Z$.

Once the state of the utensil has been established, during a step 166, the unit 30 generates a control of the apparatus 4 by using the control law selected during the step 160 and the state established during the step 164 for this permanent magnet or this pair of permanent magnets. For example, in the case of the utensil 10, the unit 30 generates a control of the apparatus 4 so that the person 6 moves in the direction in which the user has slanted the utensil 10.

Then, during a step 168, the unit 30 transmits the control thus generated to the apparatus 4.

During a step 170, the apparatus 4 executes the transmitted control and in response performs an action depending on the transmitted control.

The steps 164 to 170 are repeated for each permanent magnet or pair of permanent magnets satisfying one of the conditions $C_i$ contained in the database 38.

In parallel with the steps 146 to 170, during a step 172, the user freely actuates the utensil or utensils disposed on the face 24 to control the apparatus 4.

When the user wishes to reconfigure the interface 2, he returns to the phase 142. During this new execution of the phase 142, the user can modify the configuration of the interface 2, for example:

by removing or by adding a utensil, and/or
by moving a utensil in order to change its functioning.

Thus, the interface 2 is easily configurable whilst remaining easy to fabricate.

Numerous other embodiments are possible. For example, the front face 24 is not necessarily planar. For example, in a variant, said front face is formed in relief. Typically, this form in relief may comprise hollow seats intended to receive and to immobilize the utensils in these seats.

In a variant the inclination of a utensil comprising two permanent magnets is determined on the basis of the position of each of these permanent magnets and not only on the basis of the direction of the magnetic moment of one of these magnets. In addition, if these two permanent magnets have different magnetic moments, it is also possible to determine a direction on the basis of the positions of these permanent magnets.

Utensils other than those described above can be realized and used in the interface 2. For example, the cross 58 may be replaced by a disk. This makes it possible to indicate a direction of movement from an infinity of directions of movement by inclining the disk in this direction. In another variant the shaft 74 and the stand 76 are omitted. The user may then freely move the steering wheel with respect to the face 24.

Numerous different control laws may be developed. For example, the control of the apparatus 4 may be dependent on the speed or the acceleration of a permanent magnet with which one of the utensils is equipped. In another example the control law associated with the button 110 is a continuous function of the distance $d_{110}$. In this case, due to the presence of the spring 118, this control law is dependent on the pressure exerted by the user on the key 112.

It is also possible to associate a number of control laws with the same utensil during use thereof. For example, in addition to the law $L_1$, a control law $L_{11}$ could at the same time be associated with the utensil 10, said control law generating controls of the apparatus 4 depending on variables other than those used in the law $L_1$. For example, the law $L_{11}$ is as follows: if z is greater than a predetermined threshold $S_{11}$ then a specific control is transmitted to the apparatus 4, whereas if z is lower than $S_{11}$ this specific control is not transmitted. The specific control triggers, for example, a jump of the person 6 when moving in the direction in which the user has slanted the utensil 10. The control laws $L_1$ and $L_{11}$ may also be regrouped within one and the same control law associated with the same selection condition $C_1$.

In order to be capable of associating different control laws with the same utensil or with different utensils, it is not necessary to record a number of control laws in the database 38. In a variant a single parameterized control law is recorded in the memory 34, and each condition $C_i$ is associated with a respective set of values for the different parameters of this control law.

Numerous other selection conditions may be conceived. For example, the selection condition may test if the inclination of a magnetic moment of a permanent magnet of the utensil is within a predetermined range of values and, only if so, may associate a control law $L_k$ with the utensil equipped with this permanent magnet. A button can thus be provided that is associated with a first control law when it is the right way up and that is associated with another control law when it is used upside down.

The condition making it possible to select the control law to be associated with a utensil does not necessarily test the value of the variable A. For example, if the interface comprises only a single utensil or only a number of identical copies of this same utensil, it is then not necessary to test the value of the amplitude of the magnetic moment of the permanent magnet of this utensil because it is the same for all the copies. In this case the control law is selected for example solely depending on the position of the permanent magnet with respect to a predefined zone.

It is also possible to define conditions verifying if the position of a permanent magnet is not situated within a predefined volume but in a particular position with respect to a fixed point of the coordinate system X, Y, Z or at a point of which the position is defined by another permanent magnet separate from the utensil.

A condition $C_i$ may also test if a particular relative position of at least two permanent magnets with which the same utensil is equipped is occupied. If so, this makes it possible to identify this utensil and therefore to select a control law to be associated with this utensil. In this case it is then not necessary to use the amplitude of the magnetic moments to select the control law to be associated with this utensil.

If the number P of permanent magnets simultaneously present in front of the face 24 is known in advance, the control method may be simplified by using only the corresponding model $M_P$ to determine the position, the orientation and the amplitude of the magnetic moment of these P permanent magnets. For example, the number P of permanent magnets is grasped by the user during the configuration phase. The selection of the model having the minimal error $E_P$ may thus be omitted.

In a variant the human-machine interface 2 may comprise only a single utensil, of which the operation changes depending on its position with respect to the array of magnetometers $M_{ij}$.

In another variant the permanent magnets used to automatically select the control law to be associated with a utensil are not the same as those used to establish the current state of the utensil. It is also possible to establish the current state of the utensil by using sensors other than the magnetometers $M_{ij}$ and without using for this purpose a permanent magnet with which the utensil is equipped.

The processing unit and the magnetometers $M_{ij}$ may be simplified in order to determine solely the variable or variables necessary for the automatic selection of the control law and for the establishment of the state of the utensil. The number of values of variables determined for each permanent magnet may therefore be less than six. For example, in a simplified embodiment in which the amplitude of the magnetic moment and the orientation of each permanent magnet are known in advance, only the position of each permanent magnet is determined. Such a situation may be encountered for example if only one copy or a number of copies of the button 110 disposed on the planar face 24 is/are used.

The change in configuration of the interface 2 is not necessarily performed directly by hand by the user. In another variant the interface comprises electric actuators making it possible to modify the configuration of the interface. For example, for this purpose, the movement of the utensils or the replacement of these utensils by other utensils is motorized, such that the user does not himself have to manipulate each of these utensils.

The number of possible configurations of the interface 2 may be limited by a mechanical device. Thus, in a variant, the human-machine interface comprises a rail and the utensil, such as the utensil 10, 50, 70, 90 or 110, is mounted slidingly on this rail such that it can be moved only along this rail in order to change the configuration of the interface 2. In another variant it is also possible to limit the number of locations in which a utensil may be disposed with respect to the front face 24. For this, the interface 2 comprises a number of locations, each equipped with its own coding to prevent the fixing in this location of a certain number of utensils and, by contrast, to allow the fixing in this location of other different utensils.

The approximation used to construct the Kalman filter may also be a quaternary approximation or greater, i.e. the equations of electromagnetism are approximated to an order greater than that corresponding to the dipolar approximation.

Numerous different methods can be used to determine the position and the orientation of the magnetic object. For example, the method described in US6269324 can be used. These methods do not necessarily use a Kalman filter. For example, the methods described in US2002/171427A1 or US6263230B1 are possible.

The magnetometers of the magnetometer array are not necessarily arranged in columns and in rows. They may also be arranged in other designs. For example, the magnetometers are disposed at each apex of each triangular or hexagonal mesh of a pattern of a plan.

The arrangement of the magnetometers with respect to one another may also be random or irregular. Thus, the distance between two immediately successive magnetometers in the array is not necessarily the same for all the pairs of two immediately successive magnetometers. For example, the density of magnetometers in a given zone of the array may be greater than elsewhere. Increasing the density in a given zone may make it possible to increase the accuracy of the measurement in this zone.

The array of magnetometers may also extend in three directions that are not collinear in space. In these conditions the magnetometers are distributed within a three-dimensional volume.

The number N of magnetometers may also be greater than or equal to sixty-four or ninety.

The magnetometers of the magnetometer array are not all necessarily identical to one another. In a variant the magnetometers do not all have the same sensitivity. In this case the less accurate magnetometers are disposed for example in the proximity of the center of the array whereas the more accurate magnetometers are disposed at the periphery of this array. Such an embodiment has the advantage of placing those magnetometers that are most difficult to saturate and therefore less sensitive in locations likely to be closest to the magnetic object. This also makes it possible to extend the zone of interaction.

The apparatus 4 may be replaced by any type of electrical apparatus that must be controlled in response to an action of a human being. For example, the apparatus controlled may be a robot, a machine tool, etc.

In all the embodiments described here, the permanent magnet may be replaced by a magnetic object not supplied with power permanently and that acquires a magnetic moment in the presence of a continuous external magnetic field, such as the geomagnetic field. For example, the permanent magnet is replaced by a part made of soft magnetic material. A magnetic material is considered to be soft if its coercive magnetic field is less than 10 or 1 $A \cdot m^{-1}$. Such a part has a magnetic moment created by the interaction between the geomagnetic field and the part made of soft magnetic material.

The invention claimed is:

1. A configurable human-machine interface for controlling an electrical apparatus, the interface comprising:
   a movable utensil, the utensil being actuatable directly by a hand of a user to pass between a first state of the utensil and a second state of the utensil different from the first state of the utensil;
   a processing circuitry configured to:
      automatically select between a first control rule and a second control rule associated with the movable utensil, each of the control rules associating a first control of the electrical apparatus with the first state of the utensil and a second different control of the electrical apparatus with the second state of the utensil, and
      control the electrical apparatus depending on a current state of the utensil and the selected control rule associated to the utensil,
   wherein:
   the interface further comprises at least one permanent magnet connected to each utensil and a magnetometer array comprising N triaxial magnetometers mechanically connected to one another without any degree of freedom to maintain a known distance between each of the magnetometers, where N is a whole number greater than or equal to five,
   wherein the processing circuitry is further configured to:
   determine values of a first variable and a second variable, the first variable encoding a first coordinate of a three dimensional position of said at least one permanent magnet connected to the utensil relative to the interface, an angular orientation of said at least one permanent magnet connected to the utensil relative to the interface, or an amplitude of a magnetic moment of said at least one permanent magnet connected to the utensil, the second variable encoding a second coordinate of the three dimensional position of said at least one permanent magnet connected to the utensil, an angular orientation of said at least one permanent magnet connected to the utensil relative to the interface, or an amplitude of the magnetic moment of said at least one permanent magnet connected to the utensil, based on measurements of the magnetometers of the array, wherein the first variable and the second variable do not encode a same property of the at least one permanent magnet, wherein the processing circuitry is further configured to automatically select the first control rule when the value of the first variable is within a first range and select the second control rule when the value of the first variable is within a second range, wherein the current state of the utensil is defined by a determined value of the second variable, wherein the first state and the second state of each of the control rules are defined by the determined value of the second variable, wherein the first control of the first control rule is different than the first control of the second control rule and the second control of the first control rule is different than the second control of the second control rule, wherein the first state of the first control rule is equal to the first state of the second control rule and the second state of the first control rule is equal to the second state of the second control rule, wherein the movable utensil includes a first permanent magnet of which a three dimensional coordinate or orientation varies when the movable utensil is actuated by the user to pass between the first and second states of the utensil, the first permanent magnet being same as that used to automatically select the control rule to be associated with the utensil or being a different permanent magnet, wherein the processing circuitry is configured:
to determine, for the first permanent magnet, a value of a third variable that varies depending on a state of the utensil, based on measurements of the magnetometers of the array, and
to establish the current state of the utensil based on the determined value of the third variable, and
wherein the movable utensil further comprises a steering wheel movable in rotation about an axis and the at least one permanent magnet is fixed without any degree of freedom to the steering wheel in an eccentric position with respect to the axis or in a position in which a direction of the magnetic moment of the at least one permanent magnet is inclined with respect to the axis.

2. The interface as claimed in claim 1, wherein:
the first state and the second state are defined only by the determined value of the second variable.

3. The interface as claimed in claim 1, wherein the movable utensil comprises:
an axis having a first and a second inclination with respect to an X, Y, or Z axis of the three-dimensional coordinate system in the first and second states of the utensil respectively, and
wherein the first permanent magnet is fixed without any degree of freedom with respect to the axis of the movable utensil, in a position in which a direction of the magnetic moment of the first permanent magnet is parallel to the axis of the movable utensil.

4. A method for controlling an electrical apparatus with aid of a configurable human-machine interface, the method comprising:
actuating at least one movable utensil, directly by a hand of a user, so as to pass between at least one first state of control of the electrical apparatus and a second state;
automatically selecting a control rule to be associated with the at least one movable utensil actuated by the user from a plurality of different control rules of the electrical apparatus, each control rule associating a first control of the electrical apparatus with the first state of a utensil and a second different control or no control of the electrical apparatus with the second state of the same utensil, the control rules differing from one another by the fact that they associate different controls of the electrical apparatus with a same first state of the utensil or with a same second state of the utensil; and
controlling the electrical apparatus depending on a current state of the utensil and the control rule that has been selected for the utensil;
measuring a magnetic field generated by at least one permanent magnet connected to the utensil with aid of a magnetometer array comprising N triaxial magnetometers connected mechanically to one another without any degree of freedom to maintain a known distance between each of the magnetometers, wherein N is a whole number greater than or equal to five; and
determining, for the at least one permanent magnet of the at least one movable utensil, a value of at least one variable encoding the position, orientation in a three-dimensional coordinate system fixed without any degree of freedom to the array, or amplitude of a magnetic moment of the at least one permanent magnet, on a basis of measurements of the magnetometers of the array; and
wherein automatically selecting the control rule is based on the value of the at least one variable; and
wherein the determining includes determining, for the at least one permanent magnet, a value of a variable encoding amplitude of the magnetic moment, and the automatically selecting includes selection of the control rule to be associated with the at least one movable utensil solely on a basis of the determined amplitude of the magnetic moment of the at least one permanent magnet.

5. The method as claimed in claim 4,
wherein the determining includes determining, for each permanent magnet, a value of at least one variable encoding a three dimensional coordinate of the permanent magnet or an orientation of the permanent magnet in the three-dimensional coordinate system, and the automatically selecting includes determining, for a second utensil with at least two permanent magnets, a relative position of the at least two permanent magnets to distinguish the second utensil from any other utensil that may be used, on a basis of the values of the variables determined during the determining, and the automatically selecting includes selecting the control rule by using the relative position of the at least two permanent magnets.

6. A non-transitory computer readable recording medium, comprising instructions for executing a method as claimed in claim 4 when the instructions are executed by an electronic computer.

7. The method as claimed in claim 4, further comprising:
differentiating between different types of movable utensils based on measurements of the magnetometers of the array.

8. The method as claimed in claim 4,
wherein the interface further comprises at least one additional movable utensil; and
wherein the actuating includes actuating the at least one movable utensil and the at least one additional movable utensil to control the electrical apparatus simultaneously.

9. The method as claimed in claim 8,
wherein the interface comprises at least three movable utensils capable of simultaneous actuation; and
the automatically selecting includes automatically selecting a different control rule for each movable utensil that is actuated.

10. The method as claimed in claim 4, further comprising:
for each permanent magnet of the movable utensil, determining six variables encoding a three dimensional coordinate, angular orientation in the three-dimensional coordinate system, and amplitude of a magnetic moment, on a basis of measurements of magnetometers of the array; then
using a first of the six variables of which values have been determined for a same permanent magnet to establish the current state of the movable utensil and use of a second of the six variables, different from the first of the six variables, to select the control rule to be associated with the movable utensil.

11. The method as claimed in claim 10, wherein the current state of the movable utensil is established only on a basis of values of variables encoding an inclination of the utensil with respect to at least one axis of the three-dimensional coordinate system.

12. The method as claimed in claim 4, wherein the determining includes determining, for each permanent magnet of the movable utensil, a value of at least one variable encoding a three dimensional coordinate of the permanent magnet in the three-dimensional coordinate system, and the automatically selecting includes comparing the determined value of the variable encoding the three dimensional coordinate with a predefined zone of which limits are defined with respect to the magnetometer array to select the control rule to be associated with the movable utensil equipped with the permanent magnet.

13. The method as claimed in claim 4, wherein the determining includes determining, for each permanent magnet, a value of at least one variable encoding a three dimensional coordinate of the permanent magnet, or an angular orientation of the permanent magnet in the three-dimensional coordinate system, and the automatically selecting includes determining a relative position or orientation of the at least one permanent magnet connected to the utensil relative to a position or an orientation of another permanent magnet mechanically independent of the movable utensil on a basis of each value determined during the determining, and the first or second control rule is selected based on the relative position or orientation.

\* \* \* \* \*